United States Patent [19]
Emmins

[11] Patent Number: 5,484,171
[45] Date of Patent: Jan. 16, 1996

[54] COUPLING JOINT

[76] Inventor: Douglas H. Emmins, Private Mail Bag 51, Mannum, South Australia, Australia

[21] Appl. No.: 248,855

[22] Filed: Jun. 3, 1994

Related U.S. Application Data

[63] Continuation of Ser. No. 950,579, Sep. 23, 1992.

[30] Foreign Application Priority Data

Sep. 24, 1991 [AU] Australia ................. PK8524

[51] Int. Cl.$^6$ .................................... F16L 21/00
[52] U.S. Cl. ................. 285/31; 285/368; 285/342
[58] Field of Search ................. 285/5, 18, 31, 285/368, 412, 342

[56] References Cited

U.S. PATENT DOCUMENTS

| | | | |
|---|---|---|---|
| 481,935 | 9/1892 | Dunham | 285/31 |
| 591,362 | 10/1897 | Sisson | 285/31 |
| 666,316 | 1/1901 | Kenneally | 285/31 |
| 2,188,587 | 1/1940 | Anus | 285/5 |
| 2,449,803 | 9/1948 | Collison | 285/31 |
| 2,469,538 | 5/1949 | Young | 285/5 |
| 2,885,226 | 5/1959 | Mueller | 285/342 X |
| 2,926,028 | 2/1960 | Hookings et al. | 285/5 X |
| 3,162,469 | 12/1964 | Shohan | 285/5 |
| 3,331,620 | 7/1967 | Rickard | 285/5 |
| 3,594,023 | 7/1971 | Yano | 285/342 X |
| 3,642,306 | 2/1972 | Gheen et al. | 285/5 |
| 3,927,451 | 12/1975 | Rogers | 285/31 X |
| 4,133,563 | 1/1979 | Yamazaki . | |
| 4,878,698 | 11/1989 | Gilcrist | 285/342 |
| 5,056,755 | 10/1991 | Jang et al. | 285/31 X |

FOREIGN PATENT DOCUMENTS

| | | | |
|---|---|---|---|
| 558880 | 6/1958 | Canada | 285/5 |
| 686210 | 1/1940 | Germany | 285/31 |
| 2158816 | 7/1972 | Germany . | |
| 281024 | 7/1934 | Italy | 285/5 |
| 292023 | 2/1936 | Italy | 205/5 |
| 549886 | 3/1958 | Italy | 285/5 |
| 15356 | of 1912 | United Kingdom | 285/31 |

OTHER PUBLICATIONS

Hiroyuki Ezaki, "Pipe Fitting", Patent Abstracts of Japan, No. M-83, p. 82, JP 1-182694, Jul. 20, 1989.

*Primary Examiner*—Henry E. Raduazo
*Assistant Examiner*—Heather Chun Shackelford
*Attorney, Agent, or Firm*—Evenson, McKeown, Edwards & Lenahan

[57] ABSTRACT

A fitting used to bridge a gap in a conduit between fixed ends of a conduit. The fitting includes a first collar at a first end of the fitting having an open end made to a dimension for fitting closely around one of the ends of the conduit, and the first end being flared inwardly of the open end so the first end of the fitting can be slid over the first end of the conduit, whilst the fitting is held angled axially relative to the conduit such that the second end of the conduit is positioned to one side of the conduit. The first collar is sufficiently deep to allow for the fitting to be slid over the first end of the conduit until the second end of the fitting is clear of a second end of the conduit. The fitting can then be pivoted so as to be in line with the conduit, and then slid back to connect with the second end of the conduit.

9 Claims, 3 Drawing Sheets

5,484,171

COUPLING JOINT

This application is a continuation of U.S. application Ser. No. 07/950,579 filed Sep. 23, 1992.

FIELD OF THE INVENTION

This invention relates to a fitting for providing sealed communication across a gap between two spaced apart conduit ends.

The invention is particularly applicable where a fitting is to be positioned between two fixed and spaced apart ends of conduit, which could be, by way of example, an irrigation pipe. The fitting must overlap with both conduit ends to effect a seal with each end. In order to get overlap at both ends the fitting is generally fitted to a first conduit end, with the overlap being greater than the final overlap and then slid back over the second end. That however is somewhat impractical where the free ends of the conduit are rigid, and it is desired to make the fitting of a rigid material such as cast metal.

One approach to the problem of joining conduit ends that are fixed in position has been used for fitting irrigation valves. A space is cut into the irrigation conduit somewhat longer than the Irrigation valves, a sleeve is fitted over each conduit end, and moved back so as to bare the gap. Once the valve is put into place the sleeve is brought back and over the valve ends. Suitable sealing means are provided for all four joins.

The system described immediately above is quite expensive requiring two sleeves, and four seals, and provides for sufficient movement between the fixed ends of pipes to enable the valve to be properly positioned and sealed.

Such an arrangement requires several parts and support of that portion of the valve that bridges the gap between the free ends of the conduit, is not supported directly by the conduit itself, but by the sleeve.

It can be seen that where a valve is to be fitted in a gap within a conduit it is desirable to have a unitary fitting.

One difficulty, however, with providing a unitary fitting is to join the two ends of the conduit defining the gap, without the use of more than one axially sliding conduit part whilst still retaining an effective seal and positioning of the fitting.

A further difficulty is experienced in positioning a unitary fitting where two free ends are firmly fixed, because in order to get overlap the fitting must be of greater length than a gap between the two conduit ends which consequently is awkward or impossible to position depending on the rigidity of the conduit ends.

SUMMARY OF THE INVENTION

The present invention relates to a fitting with ends that alleviate the need for extra sleeves, and which provides for a simple system of joining to pipe ends together or a means of providing a fitting between two ends of a pipe conduit.

It is therefore an object of the present invention to provide a fitting for joining two fixed end of piping which will obviate or minimize any one of the foregoing disadvantages in a simple yet effective manner or at least provide the public with a useful choice.

The invention could be said to reside in a fitting adapted for providing for sealed communication across a gap in a conduit said gap defined between spaced apart conduit ends, the fitting including a first collar at a first end of the fitting for sealing connection around a first of said conduit ends, a second end of the fitting being adapted for sealing connection with a second of said conduit ends the first expanded collar having an open end defined within an internal face, said internal face adapted to fit closely around the first conduit end, one side of the collar being flared inwardly of an open end of the first collar, so that the fitting can be angled axially relative to the first conduit end, and so that when so angled the second fitting end extends to one side of the second conduit end, the first collar being sufficiently deep so that when the first end of the conduit is inserted within the first collar the second end of the fitting is clear of the second conduit end.

It is found that a fitting according to this invention can be positioned onto inflexible conduit ends. To achieve this the fitting can be angled relative to the conduit ends and the first expanded collar can then be slid over the first conduit end until the first conduit end nestles in the flared portion of the first expanded collar, the fitting can then be pivoted to be aligned with the conduit ends and the second end of the fitting can be slid into an engaging position on the second conduit end.

The second fitting end could be a second collar adapted to fit around the second conduit end or the end could have a reduced diameter so as to fits within the second end of the pipe.

Preferably a stop is provided at a second end portion of the fitting and adjacent the second end of the fitting so that the second conduit end can be positioned to bear against the stop, the second end of the fitting is thus intended to be downstream of the flow through the conduit and is adapted to firmly brace the fitting against flow pressure. The stop could take the form of a shoulder of the second collar.

In a very useful form of the invention the fitting is a valve for regulating flow in an irrigation system.

In a preferred form the fitting includes sealing means to seal both ends of the fitting with the conduit ends, and in one form such sealing means can include an O-ring and bracing means, which in one form could be an annular plate with holes corresponding to lugs radially extending from the fitting, and means to draw the annular plates and the fitting together to form a seal against a face of either end of the fitting, said face sloping radially inwardly away from the free end of the fitting. The sloping face provides for radially inward pressure on the O-ring and thus effects a seal between the fitting and the conduit end.

BRIEF DESCRIPTION OF THE DRAWINGS

For a better understanding of the invention will now be described with reference to a preferred embodiment with the assistance of drawings in which.

DETAILED DESCRIPTION OF A PREFERRED FORM OF THE INVENTION

Figure 1:
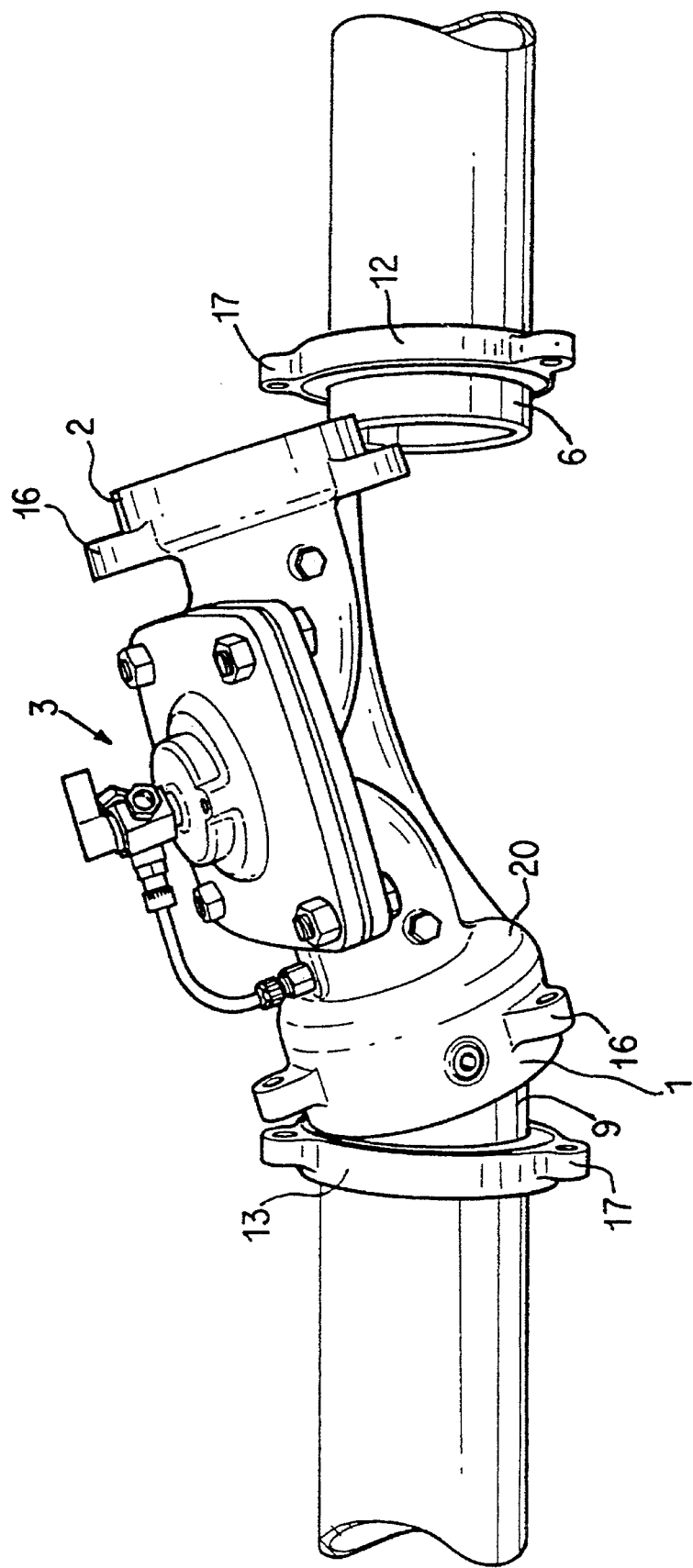
FIG. 1 is a perspective view of the first steps of a valve being positioned onto two free ends of the conduit.

The embodiment of the invention illustrated is a valve, having a first expanded collar 1 at one end and a second expanded collar 2 at a second end, with a valve mechanism 3 there-between and provision for communication between the two ends. The valve housing is made of cast metal, however other material may be appropriate depending upon the type of fitting and its intended use.

A first aperture 4 at an open end of the first expanded collar is defined by a first internal annular face 5. The first internal annular face being adapted to fit closely around a first conduit end 6. A second aperture 7 at an open end of the second collar is defined by a second internal annular face 8, which face is to fit closely around a second conduit end 9.

The first collar has a flared or bulbous portion 20 flared inwardly of the open end. The valve can be angled axially relative to the first conduit end, and so that when so angled the first conduit end protrudes into the flared portion of the collar. The extent of the flaring of the collar will be dictated by the length of the fitting and therefore the degree to which the valve is to be angled for fitting onto the first conduit end. The space available for the fitting to be positioned may also have a bearing on the extent of flaring.

The first internal annular face 5 defining the first aperture is angled with respect to the axis of the valve, so as to facilitate angled entry of the first conduit end 6.

Figure 4:
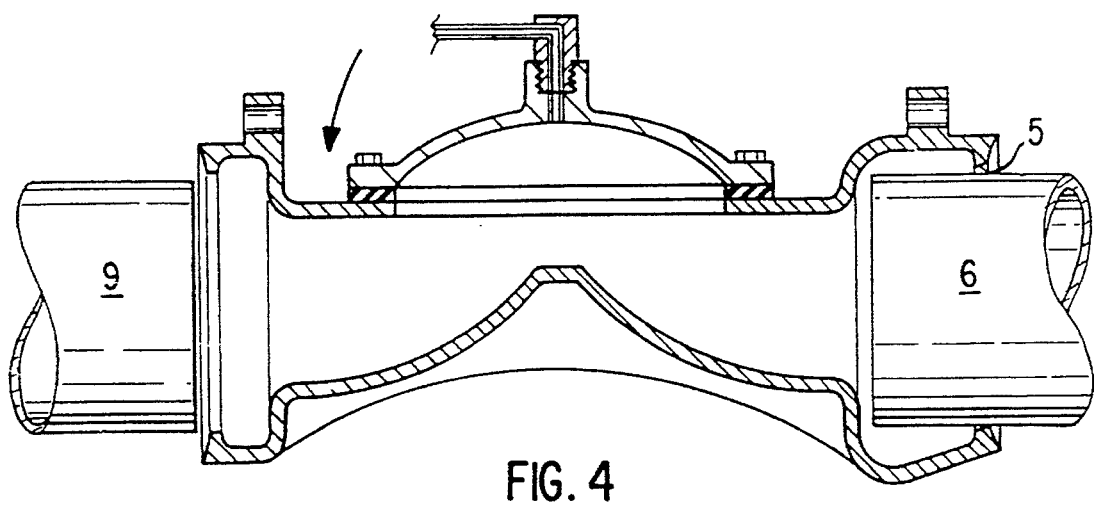
FIG. 4 is a part cross-sectional view of the valve being pivoted down so as to be in line with the conduit ends.

The outermost faces 10 and 11 of the first and second collars 1 and 2, are sloping radially inwardly away from the free end of the respective collar. The means for sealing the valve with the conduit ends is best illustrated in FIG. 4. An annular plate 12 and 13 forms a ring which is fitted over the conduit end. An O-ring 14 and 15 is fitted between the annular plate and the outermost face. Three lugs 16 are spaced apart circumferentially on the collar, and corresponding lugs 17 are provided on the annular plate. A bolt 18 is passed through each of the aligned apertures of the lugs to draw the plate towards the collar. The sloping outermost face of the collar forces the O-ring to form an effective seal between the collar and the conduit end. Although this sealing means has been described in some detail it is to be understood that other means for sealing may also be provided.

Figure 2:
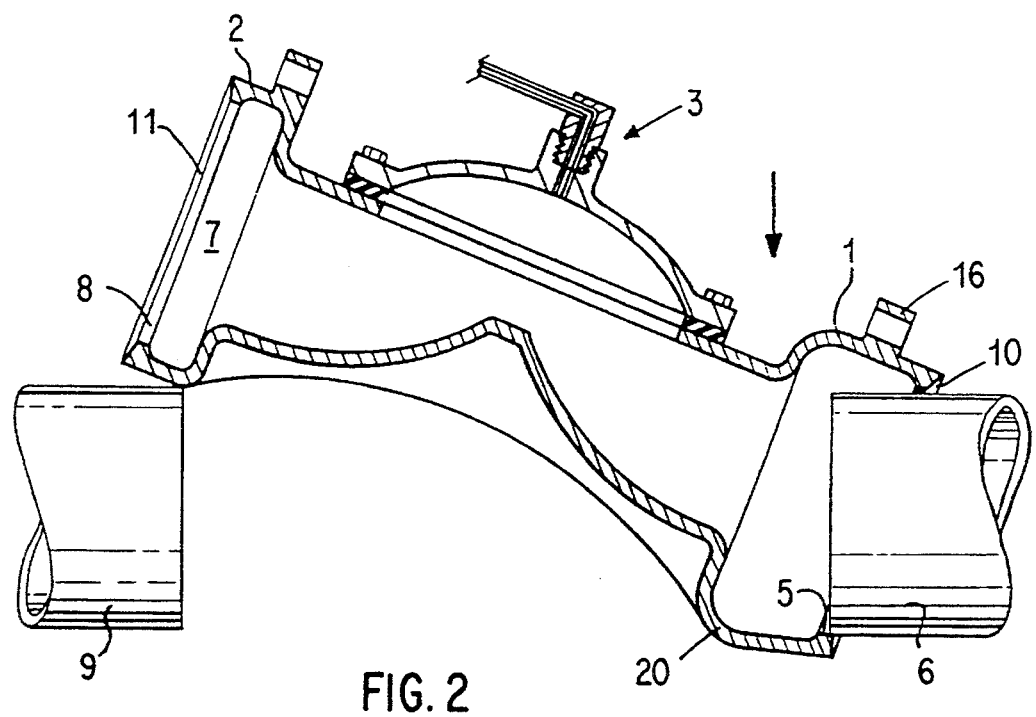
FIG. 2 is a part cross-sectional view of the valve being positioned onto two free ends of the conduit.
Figure 3:
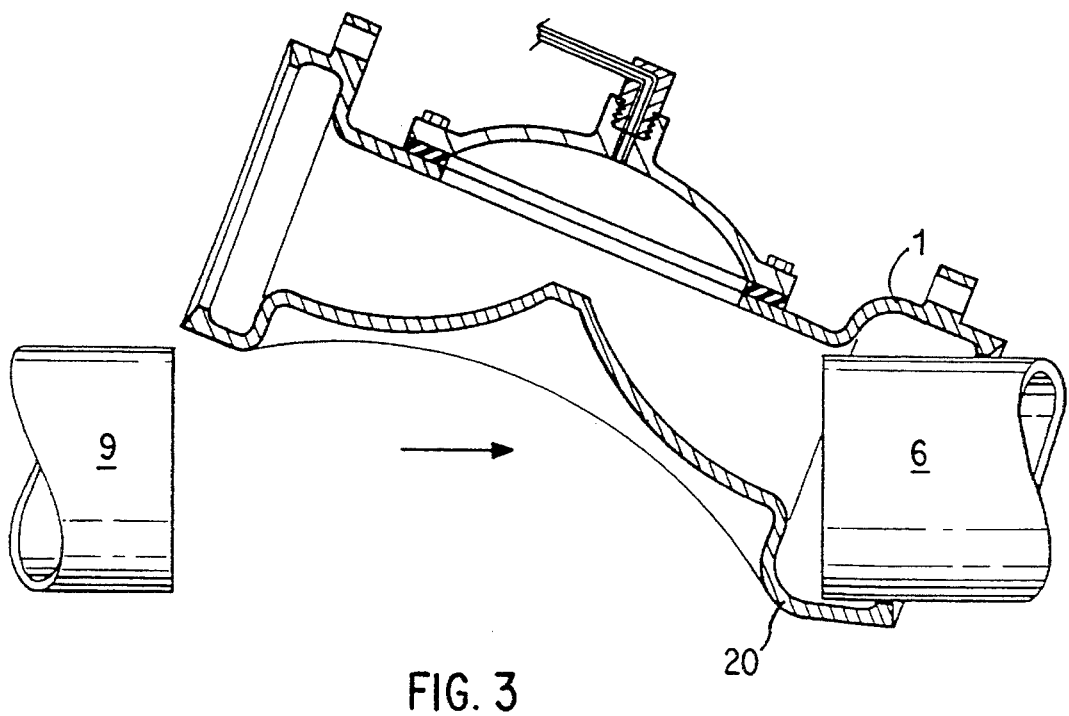
FIG. 3 is a part cross-sectional view of the valve being slid over a first free end of the conduit so that a second end of the valve is clear of the second free end of the conduit.

To fit the valve then, the valve is angled to the first conduit end 6, with an upper part of the first collar 1 fitting over the first conduit end, the second collar being kept above the second conduit end 9, as shown in FIG. 1 and FIG. 2. The valve is slid towards the first conduit end until the second conduit end us clear of the second conduit end. The valve can then be pivoted so as to be aligned with both of the conduit ends, as shown in FIG. 4. The valve can then be moved back to the second conduit end 9, until the second conduit end abuts a shoulder 19 of the second collar. The sealing means can then be fastened. Although means have been described to provide a stop to prevent axial movement of valve relative to the conduit ends, such stops may not be necessary in some applications of the invention.

Whilst the old valve can be cut out and replaced with a new valve, it is more expedient to close the old valve, cut out a suitable sized piece of pipe downstream of the old valve and insert the new valve at that cut out portion. In that way the supply need not be fully shut down and emptied.

Figure 5:
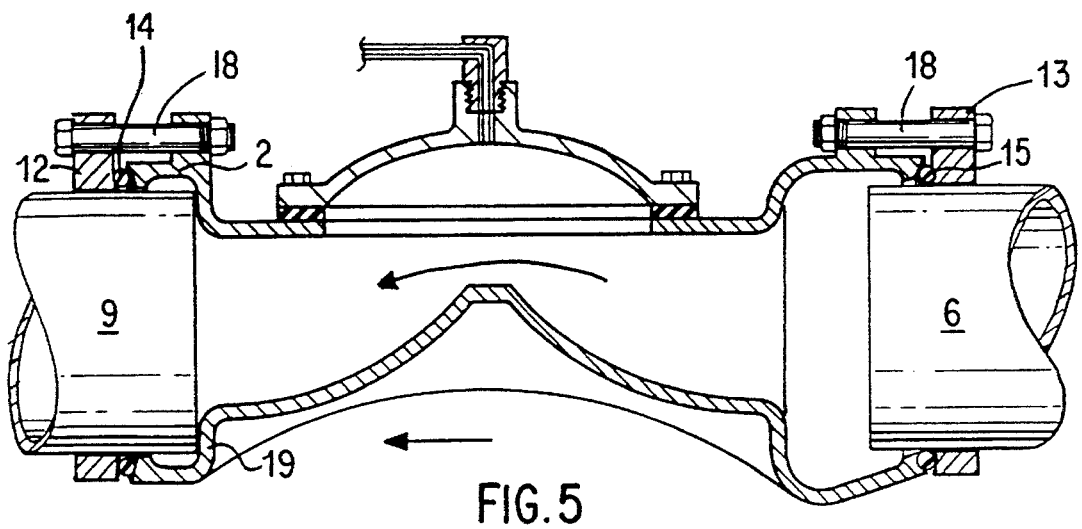
FIG. 5 is a part cross-sectional view of the valve being slid back over the second free end of the conduit, and shows the sealing and the means used to fasten the conduit into position.
Figure 6:
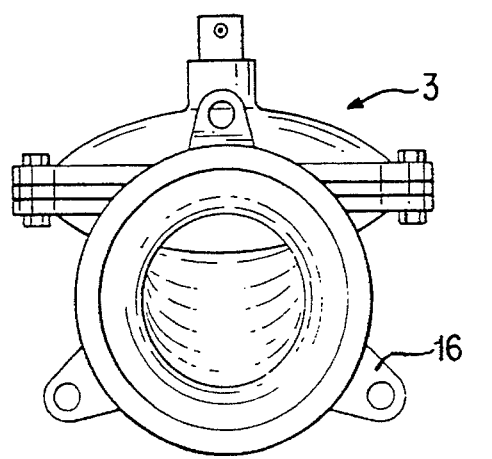
FIG. 6 is an end view of a valve showing the second end of the valve.
Figure 7:
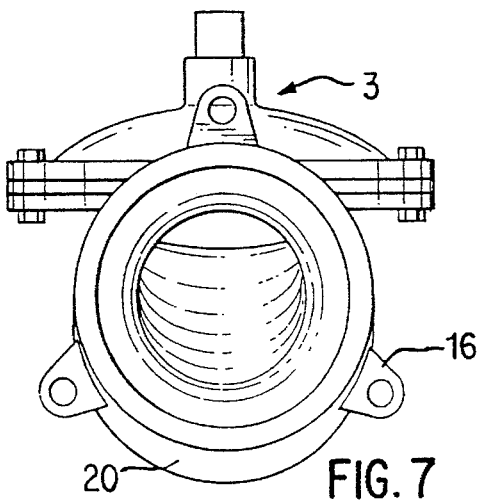
FIG. 7 is an end view of a valve showing the first end of the valve.

Generally the valve is positioned so that flow through the valve is in the direction indicated by the arrow in FIG. 5. Any water pressure will not move the valve out of the sealed position.

It may also be desired to provide for a stop for the first conduit end. It may be desired to have a means to stop the upstream end from slipping, thus in circumstances where an irrigation pipe is directed upstream it may be desired to have a stop screwed into the pipe upstream of the valve so that gravity does not cause the valve to slip.

The illustrated embodiment thus provides an effective means of allowing the positioning a fitting between two fixed conduit ends using a unitary fitting, and without the use of externally mounted sleeves.

A valve has been described by way of example however the invention is equally applicable to other fittings, and may be applicable to a sleeve for simply connecting conduit ends.

I claim:

1. A fitting for providing sealed communication across a gap in a conduit, said gap being defined between fixed and rigid spaced-apart conduit ends, the fitting including:

a first expanded collar at a first end of the fitting for sealing connection around a first of said conduit ends, a second end of the fitting including a second expanded collar adapted to fit around a second of said conduit ends, the first expanded collar having an open end defined within a first internal annular face, said first internal annular face being adapted to provide a snug fit around the first conduit end, the second expanded collar having an open end defined within a second internal annular face, said second internal annular face being adapted to provide a snug fit around the second conduit end, wherein the open ends of the first and second expanded collars lie in planes parallel to one another and perpendicular to a longitudinal axis of the fitting and means for facilitating positioning of said fitting between the fixed and rigid spaced-apart conduit ends, said means including a bulbous portion formed within a portion of the circumference of the open end of the first expanded collar, so that the fitting can be angled axially relative to the first conduit end when the first conduit end is in the first expanded collar, and so that when so angled the second fitting end extends to one side of the second conduit end, the first expanded collar being sufficiently deep so that when the first end of the conduit is inserted within the first expanded collar, the second end of the fitting is clear of the second conduit end.

2. A fitting as in claim 1 wherein the second expanded collar includes an internal shoulder so that the second conduit end can be positioned to bear against the shoulder thereby opposing water pressure in use.

3. A fitting as in claim 1 wherein the internal annular face of the first expanded collar is angled relative to a longitudinal direction of the fitting so as to be in line with the bulbous portion of the first conduit end, so as to facilitate entry of the first conduit end through the first end of the fitting.

4. A fitting as in claim 1 wherein the fitting is a valve adapted for regulating flow in an irrigation system.

5. The combination of a conduit fitted with a fitting according to claim 1.

6. A fitting as claimed in claim 1 wherein both said first and second expanded collars are essentially circular in cross-section.

7. A fitting for providing sealed communication across a gap in a conduit, said gap being defined between fixed and rigid spaced-apart conduit ends, the fitting including:

a first expanded collar at a first end of the fitting for sealing connection around a first of said conduit ends, a second end of the fitting including a second expanded collar adapted to fit around a second of said conduit ends, the first expanded collar and the second expanded collar each having an open end defined within an internal annular face, said internal annular face being adapted to fit closely around the respective first and second conduit end, means for facilitating positioning of said fitting between the fixed and rigid spaced-apart conduit ends, said means including a bulbous portion formed within a portion of the circumference of the open end of the first expanded collar, so that the fitting can be angled axially relative to the first conduit end when the first conduit end is in the first expanded collar, and so that when so angled the second fitting end extends to one side of the second conduit end, the first expanded collar being sufficiently deep so that when the first end of the conduit is inserted within the first expanded collar, the second end of the fitting is clear of the second conduit end, wherein the first and second ends of the fitting include an outwardly positioned annular end face and the open ends lie in planes which are parallel to each other and perpendicular to a longitudinal axis of the fitting, wherein the fitting includes a separate elastomeric ring for fitting around each respective end of the conduit, and a separate annular ring with a face complementary to the outwardly positioned annular face of a corresponding end of the fitting adapted for fitting over the respective conduit end, the O-ring for fitting between a respective face of outwardly positioned annular end face and the corresponding face on the respective annular ring and means to brace the annular ring against a respective face so as to deform the O-ring to form a seal.

8. A fitting as in claim 5 wherein the end face is sloping radially inwardly away from the free end of the fitting.

9. A method of providing a sealed communication across a gap in a conduit defined between spaced apart and inflexible conduit ends, comprising the steps of:

providing a fitting which includes, a first expanded collar at a first end of the fitting for sealing connection around a first of said conduit ends, a second end of the fitting including a second expanded collar adapted to fit around a second of said conduit ends, the first expanded collar having an open end defined within a first internal annular face, said first internal annular face being adapted to provide a snug fit around the first conduit end, the second expanded collar having an open end defined within a second internal annular face, said second internal annular face being adapted to provide a snug fit around the second conduit end, wherein the open ends of the first and second expanded collars lie in planes parallel to one another and perpendicular to a longitudinal axis of the fitting and means for facilitating positioning of said fitting between the fixed and rigid spaced-apart conduit ends, said means including a bulbous portion formed within a portion of the circumference of the open end of the first expanded collar, so that the fitting can be angled axially relative to the first conduit end when the first conduit end is in the first expanded collar, and so that when so angled the second fitting end extends to one side of the second conduit end, the first expanded collar being sufficiently deep so that when the first end of the conduit is inserted within the first expanded collar, the second end of the fitting is clear of the second conduit end;

positioning the first end of the collar of the fitting on a first of the conduit ends while having the fitting angled away from the axial center of the conduit so that the second end of the fitting is positioned to one side of the second of the conduit ends;

sliding the fitting over the first of the conduit ends such that the first of the conduit ends slides into the bulbous portion of the first expanded collar, and until the second end of the fitting is clear of the second of the conduit ends;

pivoting the fitting so that the second end of the fitting is in line with the second conduit end;

sliding the second end of the fitting into connection with the second end of the conduit;

effecting a seal between the fitting and both ends of the conduit.

\* \* \* \* \*